United States Patent [19]
Hanf et al.

[11] Patent Number: 5,892,893
[45] Date of Patent: Apr. 6, 1999

[54] DEVICE FOR THE BUS-NETWORKED OPERATION OF AN ELECTRONIC UNIT WITH MICROCONTROLLER, AND ITS USE

[75] Inventors: Peter Hanf, Göppingen; Jürgen Minuth, Eislingen; Jürgen Setzer, Illingen, all of Germany

[73] Assignee: Mercedes Benz AG, Germany

[21] Appl. No.: 825,027

[22] Filed: Mar. 26, 1997

[30] Foreign Application Priority Data

Mar. 26, 1996 [DE] Germany .................. 196 11 945.6

[51] Int. Cl.⁶ .................................................. G06F 11/14
[52] U.S. Cl. .............................. 395/182.01; 395/182.12; 395/182.07; 395/182.2; 395/183.19
[58] Field of Search ................... 395/182.01, 182.02, 395/185.09, 182.07, 182.2

[56] References Cited

U.S. PATENT DOCUMENTS

| | | | |
|---|---|---|---|
| 5,375,051 | 12/1994 | Decker et al. . | |
| 5,481,253 | 1/1996 | Phelan et al. | 340/825.31 |
| 5,555,863 | 9/1996 | Kokubu | 123/179.3 |
| 5,765,031 | 6/1998 | Minuth et al. | 395/183.19 |

FOREIGN PATENT DOCUMENTS

| | | |
|---|---|---|
| 2 288 522 | 10/1995 | United Kingdom . |
| WO 90/01189 | 2/1990 | WIPO . |

*Primary Examiner*—Eric Coleman
*Assistant Examiner*—Mackly Manestime
*Attorney, Agent, or Firm*—Evenson, McKeown, Edwards & Lenahan, P.L.L.C.

[57] ABSTRACT

A device for bus-networked operation of an electronic unit having microcontroller has a semiconductor circuit which is supplied from a superordinate potential, and is connected between a bus protocol module of the microcontroller and the cores of a two core bus. The semiconductor circuit, which has at least two operating modes, "transmission and reception" (NORMAL) and "sleep" (SLEEP), compromises: a receiving circuit connected to the two bus cores, whose output communicates with a reception input of the bus protocol; a transmitting circuit coupled to receive the transmission output of the bus protocol function; a wake-up identification circuit connected to the cores of the two core bus, and having a wake-up input and switching means for providing, at a control output, a switch-on signal after identification of a wake-up signal from the wake-up input or from the bus, and for emitting a switch-off signal in the SLEEP mode. A voltage regulator, supplied from superordinate potential, provides a regulated output voltage to the microcontroller and to the bus protocol module. The voltage regulator has a control input which communicates with the control output of the semiconductor circuit, and is configured to switch on in the presence of the switch-on signal and to switch off in the presence of the switch-off signal,

29 Claims, 7 Drawing Sheets

DEVICE FOR THE BUS-NETWORKED OPERATION OF AN ELECTRONIC UNIT WITH MICROCONTROLLER, AND ITS USE

This application claims the priority of German priority document 196 11 945.6, the disclosure of which is expressly incorporated by reference herein.

BACKGROUND AND SUMMARY OF THE INVENTION

The invention relates to a device for the bus-networked operation of an electronic unit having a microcontroller and a bus protocol module for communicating with other units via a two-core bus.

The growing number of bus-networked electronic units (for example in industrial installations and mobile units such as motor vehicles) inevitably leads to problems with regard to sufficiently reliable and/or sufficiently long operational capability when only a limited supply of electrical energy is available (for example, from the operating battery of a vehicle or the back-up battery of a production installation for emergency retention of processing status data, etc.) In order to conserve energy, it is known to switch off units which are not required for a specific operating phase.

Thus, in known motor vehicles, control units for which the current consumption is problematic when the vehicle is stopped, are supplied with current from a terminal of the ignition/start switch. When the ignition/start key is withdrawn, these units are thus removed from the on-board power supply system. Units whose operational capability is necessary even when the vehicle engine is not operating, are supplied with current from the continuous-current-supplied terminal 30.

However, if it is assumed that by itself the voltage regulator of every such continuous-current-supplied unit consumes approximately 500 $\mu A$, the quiescent current requirement of the transceiver (reception discriminator and output stage) between bus and electronics is approximately 150 $\mu A$, and the quiescent current requirement of the respective unit peripherals (for example voltage dividers, sensor current sources, etc.) is in each case approximately 500 $\mu A$, the resultant total quiescent current requirement for each unit is more than 1 mA.

If, in the example of a motor vehicle having bus-networked control units, 30 such units, for example, are present, this would mean a total quiescent current requirement of at least 30 mA. Thus, such a motor vehicle which has been taken out of service can no longer be started after approximately 3–4 weeks, on account of constant discharge of its battery. As a result, for motor vehicles which are to be shipped to a different continent, for example, it is necessary to disconnect the battery from the on-board electrical system prior to shipping, to ensure their startability at the destination.

Similar problems also arise in commercial vehicles for auxiliary technical deployment which are used only rarely, and whose dedicated technical equipment is bus-networked.

One object of the present invention therefore, is to provide a device for bus-networked operation of an electronic unit with a microcontroller, which permits the unit to be operated for as long as possible with reduced Ado activity, from a limited energy reserve.

Another object of the invention is to permit a bus-networked electronic unit to remain for as long as possible in operational quiescence or operating states with reduced activity, from a limited energy reserve, and to develop normal activity very rapidly in a controlled manner from such quiescence, or states with reduced activity.

Another object of the invention is to make it unnecessary to provide both the bus protocol function and the microcontroller for the purpose of maintaining both the wake-up capability of the unit and the perception capability regarding bus errors that occur.

To achieve these objects, the device according to the invention comprises a semiconductor circuit which can be supplied from a higher level or "superordinate" potential, arranged in the signal flow path between the two bus cores on the one hand and the bus protocol module on the other, and is capable of at least two operating modes: a "transmission and reception" mode (NORMAL) and a dormant or "sleep" mode (SLEEP). The device itself comprises a receiving unit which is connected to the two bus cores and whose output communicates with the reception input of the bus protocol function; a transmitting unit whose input communicates with the transmission output of the bus protocol function; a wake-up (activation) identification unit connected to the bus, which has a wake-up input, and a switching unit for providing, at a control output, a switch-on signal (ENA/NINH) after identification of a wake-up signal from the input or from the bus, and for emitting a switch-off signal (NENA/INH) in the operating mode "sleep" (SLEEP); a voltage regulator supplied from the superordinate potential, which provides a regulated output voltage to supply the microcontroller and the bus protocol module with operating power, and which has a control input that communicates with the control output of the semiconductor circuit, and is configured in such a way that it switches on in the presence of the switch-on signal (ENA/NINH) and switches off in the presence of the switch-off signal (NENA/INH).

In one embodiment of the invention, the regulator has autonomous means for the defined starting of the microcontroller as soon as the latter is provided with the operating voltage.

According to another feature of the invention, the semiconductor circuit is configured in such a way that, in the event of a bus error which impairs the normal method of communication via the two bus cores, the semiconductor circuit can be set, reconfigured or adapted for the best viable alternative for emergency communication via the bus, with regard to both the receiving means and the transmitting means, without any support by the microcontroller.

In another embodiment of the invention, the device comprises two termination elements which can be selected as a function of the number of bus subscribers, and its semiconductor circuit comprises a bus error identification unit and a cooperative bus termination changeover unit as well as a bus error and wake-up evaluation unit for conditioning at least one error or interrupt signal (ERR/INT), which can be output to the microcontroller, in the wake-up or bus error instance.

This embodiment facilitates a particularly rapid reaction to wake-up signals and bus errors, since software support in this regard is no longer necessary.

Further advantageous embodiments and features of the invention provide the following additional advantages:

After the build-up of the supply voltage for the microcontroller, a reset which is controlled from the voltage regulator, permits the output of at least one signal for setting the operating mode of the semiconductor circuit after a precisely defined time. This can be utilized for the purpose of testing the initialization section regulator-microcontroller for freedom from errors.

Even in the event of bus errors in the SLEEP mode, a wake-up capability via the bus is still maintained to the largest possible extent.

The bus termination can be controlled in a simple manner in different operating modes, even in the event of a fault, so that all essential elements can be integrated.

External auxiliary and protective circuitry are unnecessary.

An inherent disturbance or an inherent error in the unit does not impair the functioning of the remaining subscribers on the bus.

Latch-up of the bus network due to faults in the region of the transmitting output stage, its input signal path and, if appropriate, its state controller, is prevented.

Reduced current is consumed-in the second operating mode, even in the event of an error.

High interference immunity is provided in the operating state "sleep" (SLEEP).

Extensive integrability of all the back-up terminations is achieved.

This device provides rapid detection of bus faults and the fastest possible activation of an electronic unit equipped with it.

The superordinate power supply potential is monitored.

Detailed analysis of and reaction to various supply dip phenomena is provided.

Simple integrability and minimization of the number of terminals of a corresponding semiconductor circuit is provided.

Disconnection of the electronic unit from its power supply is detected.

The bus is not loaded in an uncontrolled manner in the event of failure of the operating voltage or when a unit is deliberately switched off, thereby maintaining undisturbed bus communication in the event of a supply defect or when a unit is switched off.

The system provides fastest possible, autonomous reaction of every unit equipped with the device to a bus error, without the requirement of bus communication. Reconfiguration which is provided for this purpose can be effected in such a way that message losses are completely precluded.

The invention provides high electromagnetic compatibility and high interference suppression, particularly in the event of a fault.

The semiconductor circuit is created as desired by design compilation, together with other semiconductor circuit functions, on a semiconductor chip.

The device achieves low production costs and small physical size and weight.

The device can be used in a means of transport.

Overall, the device permits all signal discriminators required for reception from the bus and the bus core drivers required for transmission (that is, the transmitting output stage), and all means for real-time bus error identification and handling, to be concentrated in a single semiconductor circuit. Consequently, this circuit represents the physical layer between the bus protocol chip or the bus protocol function of the relevant unit and the microcontroller thereof, and the two cores of a bus which is configured, by way of example, in accordance with the CAN standard. It is therefore unnecessary to operate the microcontroller to identify possible bus faults, and also to reconfigure the receiving and transmitting unit on a fault by fault basis in order to transition from the differential two-wire method of operation to a single-wire method of operation, for example via ground.

The functional autonomy of the device means that it is possible to dispense with software-supported tests on the bus, which are comparatively slow and, above all, occupy the bus protocol function. This improves the reaction speed of a corresponding network in the event of bus faults (thereby avoiding message losses).

The bus protocol chip no longer needs to monitor the bus for faults when the relevant electronic unit is to be switched off for the purpose of saving current. This is necessary so that the customary bus protocol chip or the corresponding protocol function can be switched off when the relevant unit is to be deactivated to save current. The ability to switch the bus protocol function off permits a considerable current saving because the voltage regulator of the relevant unit can thus be switched off. It is necessary to cover only the quiescent current of the device according to the invention.

The device draws this quiescent current past the voltage regulator of the relevant electronic unit directly from the superordinate power supply busbar—in other words, for example, from the central on-board electrical system terminal of a motor vehicle. By virtue of its connection to that potential, the device can also evaluate precisely this supply potential and/or monitor the proper functioning of the voltage regulator, to the extent that the bus is or remains disconnected in the event of a fault.

Other objects, advantages and novel features of the present invention will become apparent from the following detailed description of the invention when considered in conjunction with the accompanying drawings.

DETAILED DESCRIPTION OF THE DRAWINGS

Figure 1:
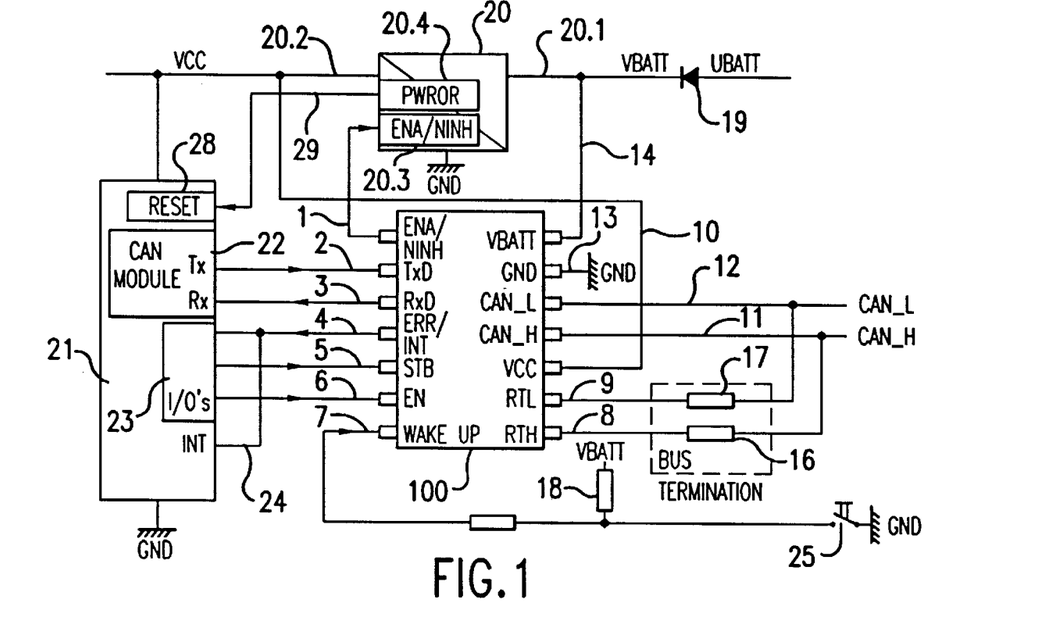
FIG. 1 is a block diagram of the device according to the invention, implemented in a CAN bus network.

As shown in FIG. 1, the device according to the invention comprises an integrated semiconductor circuit 100, made by any desired technology and configuration, as well as a voltage regulator 20 which can be switched on and off electronically and replaces the voltage regulator which is customarily contained in corresponding electronic units.

As shown in figure, the semiconductor circuit 100 can take the form of an integrated component in the conventional sense. It can also be embodied, however, as a system on a monolithic semiconductor chip, deposited there, for example, as component part of a more extensive semiconductor circuit (for example after the manner of a standard cell). In any event, the scope of the invention includes, without restriction, all intervening forms of embodiment as well.

The semiconductor circuit 100 is connected between the bus cores CAN_H and CAN_L on the one hand, and the bus protocol module 22 assigned to the microcontroller 21 of the electronic unit under consideration, on the other. In other words, it decouples the bus protocol module from the bus cores CAN_H/CAN_L. (In the following text, CAN_H and CAN_L designate the respective bus cores, while CAN_H/CAN_L designates both cores--that is to say the bus as a physical two-wire line).

CAN_H and CAN_L are routed to corresponding terminals 11 and 12, respectively, of the semiconductor circuit 100, which for its part, is connected to the Tx/Rx communication port of the bus protocol module 22, via respective connection paths 2 and 3 for transmission of data TxD and receiving data RxD. Further terminals 8 and 9 of semiconductor circuit 100 are connected via two termination resistors 16 and 17, to the corresponding bus core CAN_H and CAN_L, respectively.

Furthermore, the semiconductor circuit 100 has an input 7 which is connected via a resistor 18 to logic H potential (for example to supply potential or a potential close to the latter). On the other hand, the resistor 18 can be connected to ground GND via a remote switch 25.

The semiconductor circuit 100 has at least one terminal for emitting an error and interrupt signal (ERROR and INTERRUPT) at an output 4, which is connected to a corresponding input of the I/O port 23 and/or to a corresponding interrupt input 24 of the microcontroller 21. It also has two inputs 5 and 6, which are driven in a corresponding manner in the opposite direction from the I/O port 23 of the microcontroller 21, for a STANDBY signal (STB at the input 5) and a TRANSMIT-ENABLE signal (EN at the input 6).

For its power supply, the semiconductor circuit 100 has a terminal 13 which is connected to ground GND, and a terminal 14 connected to the supply potential VBATT. The latter is preferably drawn from a superordinate supply potential UBATT via a polarity reversal protection device 19.

The semiconductor circuit 100 furthermore has a control output 1 and an input 10, which are both connected to an electronic voltage regulator 20 to whose input 20.1 the supply potential VBATT is likewise routed.

The output 20.2 of the regulator 20 is connected to the abovementioned input 10 of the semiconductor circuit 100, and, also supplies operating current at a voltage VCC (which is reduced by the regulator drop in comparison with VBATT) to the microcontroller 21 and the bus protocol module 22, as well as to the remaining electronics (indicated pictorially in FIG. 13) of the electronic unit comprising the device.

The regulator 20 furthermore has an input 20.3 for a (VOLTAGE REGULATOR) ENABLE and EMERGENCY-INHIBIT or EMERGENCYENABLE and INHIBIT signal (referred to herein as ENA/NINH or NENA/INH respectively). This input 20.3 communicates with the control output 1 of the semiconductor circuit 100. Furthermore, the regulator 20 also has a POWER ON RESET output 20.4 (hereinafter PWROR), which communicates with a reset input 28 of the microcontroller 21 via a line 29.

For a clear understanding of the functioning of the device as described up to this point, first the internal functional structure of the semiconductor circuit 100 will be discussed in more detail with reference to FIG. 2 to FIG. 8.

Figure 2:
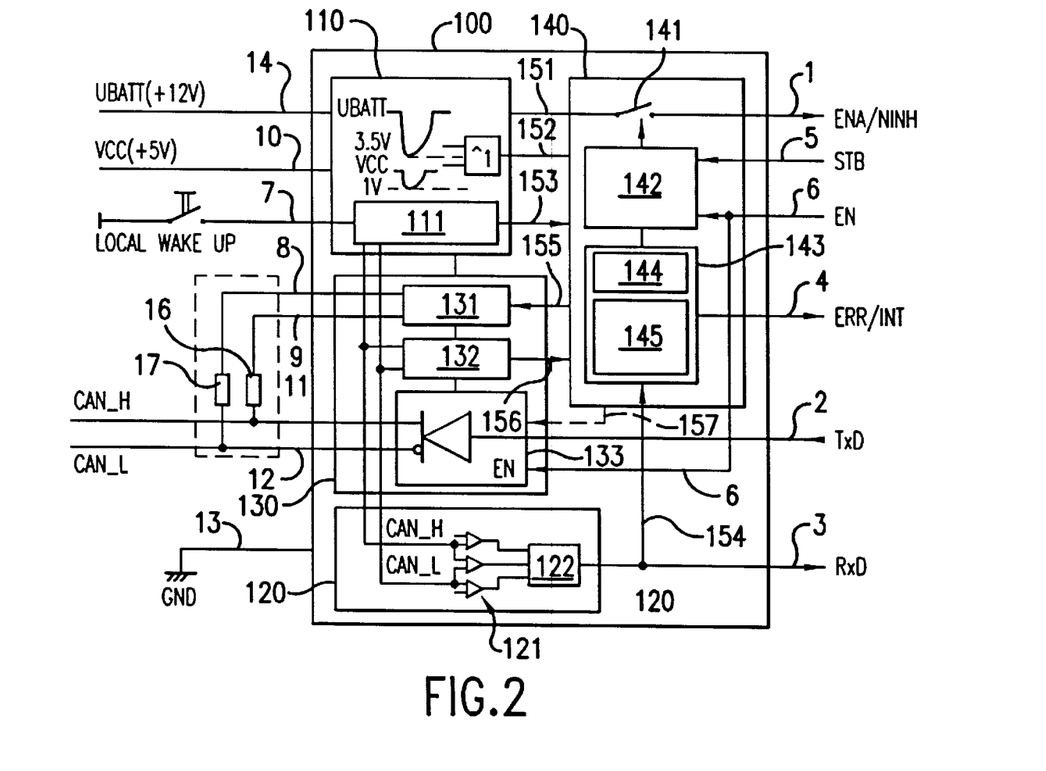
FIG. 2 is a schematic illustration of various functions of the integrated semiconductor circuit 100 in FIG. 1 which are combined to form function blocks.

As shown in FIG. 2, the semiconductor circuit 100 is divided (by way of example) into four blocks 110, 120, 130 and 140. (The supply paths of these blocks which are required for the internal power supply have been omitted in FIG. 2 in the interest of simplicity.) The allocation of functions among these blocks as described in the following text is by way of example only, and does not restrict the invention. The distribution shown has proved to be expedient for a first realization of the semiconductor circuit 100, however, and can be varied depending on different realization technologies.

One essential physical function of the semiconductor circuit 100 is the electrical insulation of the bus protocol module 22 from CAN_H and CAN_L, on which there can occur surge and load dump transients that might destroy the bus protocol module 22, whose sensitivity depends on the fabrication technology, and under certain circumstances, might even damage the entire microcontroller 21. For this purpose, the semiconductor circuit 100 may comprise conventional specialized semiconductor elements which are not described in greater detail here and, preferably, may be contained in the block 110. In particular overvoltage protection is provided with respect to the supply potential busbar VBATT. The realization of such means is familiar to a person skilled in the art.

The block 110 furthermore comprises the internal power supply for all the subfunctions from the supply potential VBATT present at the terminal 14 of the semiconductor circuit 100. A control and switching potential (for the generation of the ENA/NINH signal for the voltage regulator 20) which is looped through the block 140 is made available to the block 140 via a path 151.

Furthermore, the block 110 comprises a detector which detects a drop in the supply potential VBATT (present at the terminal 14) below a first limit value VL1 (for example 3.5 volts in the case of a motor vehicle). Preferably, it also detects a drop in the regulator output potential VCC (at the terminal 10) below a second limit value VL2 (for example 1 volt in the case of a motor vehicle). In addition, it may also optionally detect the simultaneity or chronological sequence of the occurrence of such voltage drops. The signals of the detectors are combined by logic means to form a power failure signal, which can be communicated to the block 140 via a path 152. The meaning of this signal will be explained in more detail below.

Block 110 also comprises, by way of example, a wake-up identification logic arrangement (WAKE-UP Logic) 111, to which are connected, on the one hand, the above-described terminal 7 and, on the other hand, the bus cores CAN_H and CAN_L connected to the terminals 11 and 12. This wake-up logic arrangement is configured to convert not only an analog wake-up signal or a wake-up signal edge from the terminal 7, but also a wake-up message from the bus, into a standardized WAKE-UP signal which is output via the path 153 to the block 140 (for the purpose of evaluation in the function block 145).

The block 120 preferably comprises all of the reading means 121 required for the read-out of the bus, including both differential and single-wire signal acquisition, as well as the error handling and logic means 122 which are necessary for bus-error-dependent changing of the various reading modes (for example two wire, single wire to GND or VCC, and also, under certain circumstances, single wire to "dead wire", etc.). These may preferably also comprise, inter alia, reference level comparators, core level comparators and/or sign discriminators.

The block 120 may be configured so that it is capable, automatically and/or independently, of error-responsive setting and/or reconfiguration and/or adaptation of its receiving means—independently of the transmitting means and their corresponding error-responsive setting and/or reconfiguration and/or adaptation. That is, it is configured to have absolute operational and functional autonomy (full-supported receiver).

The digital message signal RxD is emitted by downstream logic means 122 both to the terminal 3 of the semiconductor circuit 100 and, via an internal path 154, to the error signalling module 143 in the block 140.

The block 130 comprises all the means which are part of the signal flow path and are not assigned to the receiving block 120. To this extent, they are assigned in the broadest sense to the transmitting means in the signal flow path.

This is connected with the fact that both the receiving means and the transmitting means are preferably designed and dimensioned so that—without requiring external protective measures—they are in each case intrinsically realized autonomously. Thus, they are tolerant of errors with respect to all possible error states for specific applications throughout the bus. That is, they cannot be damaged by such error states. To this extent, the function blocks 131 and 132, which are still connected to the bus (together with the wake-up identification logic arrangement 111 and the receiving means 120), assigned, in this example, to the transmitting block 130. To this extent block 130 contains transmitting means in the broadest possible sense; in the narrow sense, block 133 comprises transmitting means. (The design details for damage-free error tolerance which are to be provided depending on the selected fabrication technology for the semiconductor circuit 100, are known per se).

In the block. 130, the function block "termination changeover means" 131 changes the bus termination and switches it to a high resistance, as prescribed by the termination resistors 16 and 17. A function block 132 "bus fault identification means" detects error states on CAN_H and CAN_L, in particular short circuits of a bus core to ground GND or to UBATT in the sleep or standby state (SLEEP/STANDBY). A transmitting means in the form of an output stage 133, which is tolerant of such faults, contains, internally, CAN_H and CAN_L individual drivers which are connected on the output side to the terminals 11 and 12.

As essential elements, an output stage of this type may comprise high-side and low-side switches whose switching outputs are connected to the bus cores by coupling diodes. In any event, the output stage is designed so that it can be set and/or reconfigured and/or adapted (for example changed to single-core operation) to adopt the best method of emergency communication which is still possible in each case, depending on the type of bus fault that occurs. The block 130 also comprises means which are, if necessary, required for this purpose.

The output stage may also be designed so that it is or remains automatically disconnected from the bus CAN_H/CAN_L (for instance by inhibiting its EN input) when a defect or intrinsic fault of the semiconductor circuit 100 occurs. (Such disconnection may be mandatory.) Furthermore, particularly in the case of an intrinsic fault, the power supply of the output stage can also be designed so that it can be automatically disconnected. In this manner, a latch-up of the bus network due to incorrect energization of the bus cores is avoided particularly in the event of faults in the region of the output stage, its input signal path or its state controller. The abovementioned coupling diodes may then act as decoupling valves in this connection.

The function block 132 is connected to the function block 131, and furthermore to the control block 140. It also communicates with the transmitting output stage 133, which has a switch-on/off input (TRANSMIT-ENABLE) EN that communicates with the terminal 6 of the semiconductor circuit 100.

The capability for mandatory disconnection of the output stage 133 from the bus CAN_H/CAN_L may be realized, for example, in such a way that the input EN of the output stage 133 can be latched in the event of a defect, so that the transmission signal TxD can no longer affect the bus. Such mandatory disconnection may also be provided for the situation where the potential VBATT and/or VCC drops below a predetermined threshold value, so that any undesirable inactive burden on the bus is avoided.

The control block 140 performs several functions. For example, for initializing the microcontroller 21, it has a controlled switch or a gate 141 which emits, at the terminal 1 of block 100, a switch-off and switch-on signal ENA/NINH for the voltage regulator 20, a function block 142 for identifying and setting the operating modes required by the microcontroller ("sleep", "standby", "receive only" and "normal", the latter corresponding to "transmission and reception") and a fault signalling module 143.

The error signalling module 143 preferably comprises a function block 144 for evaluating bus faults and generating a (BUS) ERROR INTERRUPT signal, and a function block 145 for generating a WAKE-UP INTERRUPT signal as a function of a wake-up signal and/or a POWER FAIL INTERRUPT (due to a supply deficiency state), as explained in more detail below. As is also explained below in conjunction with FIG. 12b, to generate these various signals, the block 143 contains, for example, at least three flag flip-flops for a WAKE-UP flag, a POWERFAIL flag and a BUS ERROR flag. These flags are read out as INTERRUPT depending on the operating mode.

In order to identify the different operating modes, the function block 142 has, for example, a port which is two bits wide, comprising input 5 for STB (STANDBY) and input 6 for EN (TRANSMIT-ENABLE). The latter is connected, as mentioned, to the identically labelled switch-on/off input of the output stage 133. The invention is of course not restricted to the four operating modes (given by way of example here) of the semiconductor circuit 100 which can be selected in binary fashion by means of two logic levels.

The function block 142 is connected to the error signalling module 143, which in this example, has a single output ERROR/INTERRUPT (hereinafter, ERR/INT) connected to the output terminal 4 of block 100. This output is a fault indication or interrupt signal. An internal input to the signalling module 14 receives the message signal output from the block 120 via the path 154 as mentioned previously. Different meanings can be allocated to an ERR/INT signal at terminal 4 by means of an assignment to different operating states of the semiconductor circuit 100.

Provided that a correspondingly larger number of terminals is tolerable for the semiconductor circuit 100, it is also possible to provide at least two separate outputs for ERROR and INTERRUPT signals, respectively, which do not then need to be interpreted depending on the operating mode. The present example, however, is based on an only 14-pole DIL pin-out for logic circuits in the SO-14 package, for instance. The different interpretation of the signal which can be picked off at the output 4 which is required due to this limitation of the number of terminals to a total of fourteen, will be explained below in conjunction with FIGS. 12a and 12b.

The functioning of the device described thus far is as follows.

The voltage regulate 20 include elements which generate a PWROR signal at the output 20.4 each time the unit is switched on. This signal is transmitted via the connection 29 to a reset input 28 of the microcontroller 21 in order to ensure proper initialization of the latter following the build-up of its supply voltage VCC.

Figure 12A:
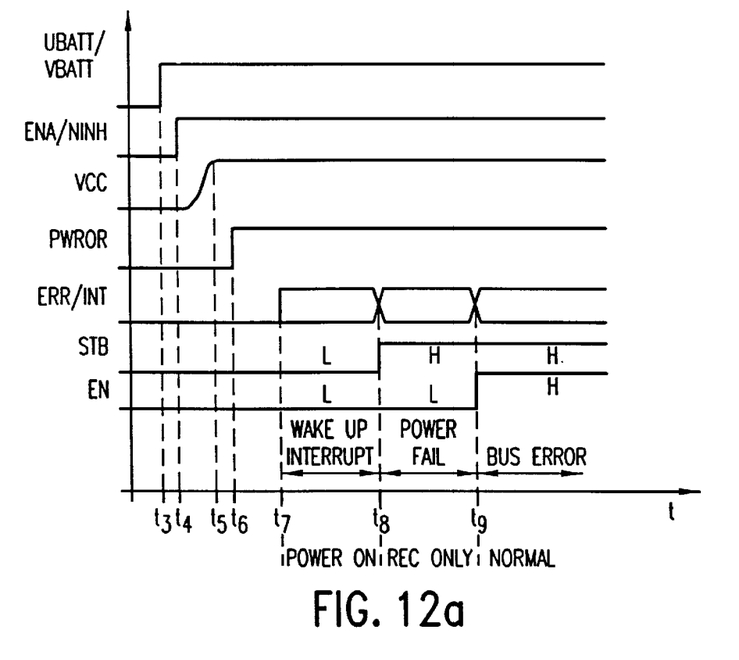
FIG. 12a is a simplified diagram of various voltage profiles after connection to an operating current source.

Since the voltage regulator is switched on via ENA/NINH from the semiconductor circuit 100, the initialization section regulator-microcontroller can be checked for faults, in the semiconductor circuit 100, by monitoring the time interval between the ENA/NINH edge which activates the regulator 20 and one of the EN and STB bits for setting the initial operating mode of the semiconductor circuit 100 ($t_8-t_4$ to in FIG. 12a).

The selection bits present at the terminals 5 (STANDBY/STB) and 6 (TRANSMIT ENABLE/EN) select one of the four operating modes (by way of example in this case) SLEEP, STANDBY, RECEIVE ONLY and NORMAL of the semiconductor circuit 100. These operating modes are managed in the framework of superordinate bus management software for lip the operation of the bus network and are initiated explicitly by the application software of the relevant electronic unit in which the device is located.

In the operating mode SLEEP, the switch or the gate 141 is activated so that the logic signal ENA/NINH output from the control output 1 to the control input 20.3 of the voltage regulator causes the regulator 20 to be switched off. To save current, the logic potential at the control output 1 is, for example, "L" in this operating mode. Because the regulator 20 is switched off, the microcontroller 21 and the bus protocol module 22 are without supply voltage VCC, and therefore have zero current. Thus, in the steady state, the potential present at the two inputs S (STB) and 6 (EN) is zero, and no current flows into these inputs. This condition corresponds to the selection word "LL" at the I/O port 23 of the microcontroller 21 for the two signals STB and EN in the operating mode SLEEP.

In this case, therefore, only the supply voltage VBATT is present at the semiconductor circuit 100, while the voltage VCC at the terminal 10 is zero. Minimal current is consumed therefore, caused only by the semiconductor circuit 100 from the busbar VBATT. Since VCC=zero, all of the VCC-supplied electronics of the units under consideration have zero current.

In the operating mode SLEEP, the device must identify only a defined minimal activity on CAN_H/CAN_L and/or quasi-static wake-up requests at the terminal 7, for example from a switch 25. In order to save current, the latter is preferably designed to make contact to ground GND, and, as required, must also generate the ENA/NINH signal, in other words manages with a supply current of 30–500μA.

This operating mode is consequently used for units which can tolerate a certain lag time (order of magnitude 25 ms) between the build-up of the potential VCC and excitation of the internal clock frequency and the initialization of the watchdog of the microcontroller 21.

In the event of a wake-up due to activity on CAN_H/CAN_L, the activity sensed by the wake-up identification logic arrangement 111 in 110 causes the switch 141 in the control block 140 to activate the voltage regulator 20. As a result, VCC is switched on, activating the bus protocol chip 22, the clock oscillator of the microcontroller 21 and its watchdog (not shown here in the figures). If appropriate, message data is output to the Rx input of the bus protocol module 22, via terminal 3.

In the case of local wakeup via switch 25, actuation of the latter causes the input 7 to be set to "L". In response, the wake-up identification logic arrangement 111 likewise actuates the switch 141 via path 153, leading to the same wake-up result.

The device can be switched to the operating mode NORMAL from the SLEEP mode by means of a WAKE-UP request, either via the bus (in other words by means of the wake-up identification logic arrangement 111) or as a local request caused by the switch 25.

In the operating mode STANDBY, the ENA/NINH signal emitted from the semiconductor circuit 100 to the voltage regulator 20 switches the latter on or keeps it switched on, so that the supply voltage VCC is also present in the STANDBY mode. Consequently, both the bus protocol module 22 and the remaining electronics of the unit under consideration are kept in operation, and the STANDBY signal level "H" (which differs from "L") can be output from the microcontroller 21 to the input 5 of the semiconductor circuit 100.

Thus, the operating mode STANDBY is used for units or situations in which the lag time (order of magnitude 25 ms) which can be tolerated in the case of the operating mode SLEEP until the bus protocol chip becomes operational, must not be lost. Practical examples are: running with cylinders in neutral on a printing machine, and infrared remote control of the door locking mechanism of a motor vehicle. These functions require reception readiness within an extremely short time in order to avoid response inhibitions and/or message losses.

The semiconductor circuit 100 can be placed into the operating modes STANDBY, RECEIVE ONLY and NORMAL in a total of three different ways: from the microcontroller 21 via terminals 4, 5 and 6; by a message received via CAN_H/CAN_L; and by a local wake-up request by means of a switching contact, for instance.

In all three cases, it is essential that, during the wake-up, the two control bits EN and STB of the switch-on signal ENA/NINH have the logic state "L", and that one of these bits must change to the logic level "H" for the subsequent maintenance of the switch-on signal ENA/NINH. The provision of the switch-on signal ENA/NINH is therefore subdivided into an initialization phase under the supervision of the semiconductor circuit 100 (for as long as the microcontroller 21 is still not completely supplied with current or completely initialized), and a holding phase under the supervision of the microcontroller. Only the microcontroller can return the semiconductor circuit 100 to the operating mode SLEEP, on the basis of its application software.

Figure 3A:
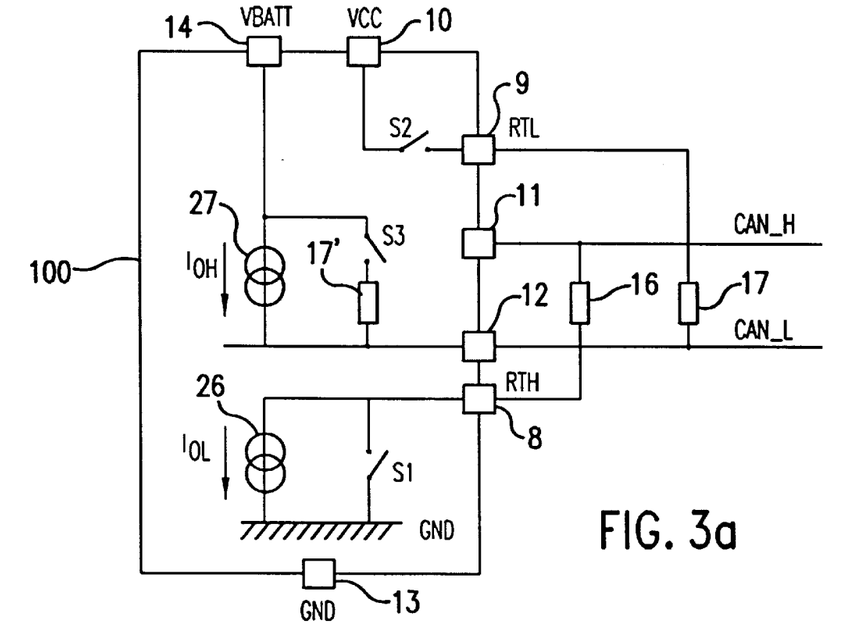
FIG. 3a is a schematic circuit diagram of the termination circuitry of the bus cores which is effected by the function block 131.
Figure 3B:
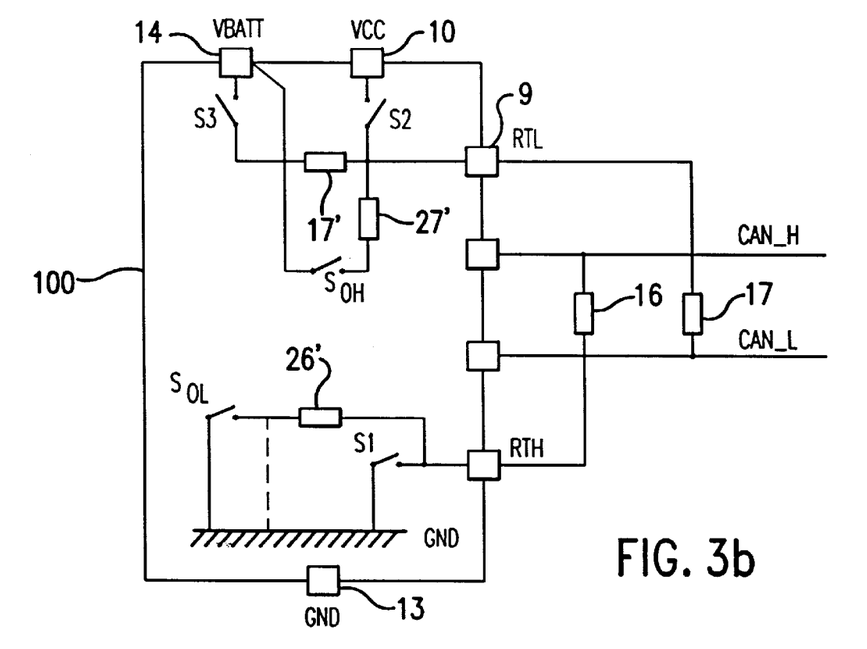
FIG. 3b is a circuit diagram, analogous to FIG. 3a, with resistive replacement of impressed current sources and with a further switching function.
Figure 4:
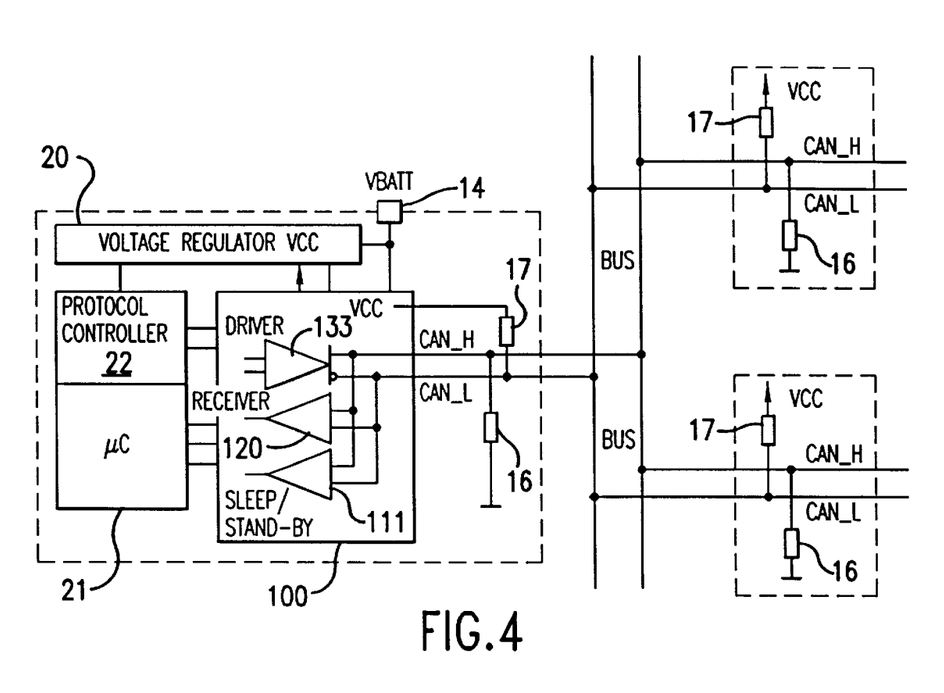
FIG. 4 is a schematic circuit diagram of the device according to the invention in a CAN network interconnection with other such devices, in the operating mode "NORMAL"

The method of operation of the function block 131 with regard to the termination resistors 16 and 17 connected to CAN_H and CAN_L will now be explained with reference to FIG. 3a to FIG. 7. FIGS. 3a and 4 illustrate the termination circuitry of CAN_H and CAN_L in the normal, active operating states (transmission and reception), without the presence of a bus error.

As shown in FIG. 3a, the function block 131 contains, inter alia, a switch $S_1$, which can connect the terminal point 8 to ground GND and, thus connecting CAN_H via the external termination resistor 16 to ground. A switch $S_2$ can connect the terminal point 9 to the regulated supply potential VCC, thereby connecting CAN_L via the external termination resistor 17 to VCC. At least one further switch $S_3$ can connect CAN_L via an internal resistor 17' to the higher supply potential VBATT. Switch $S_1$ is bridged by a current source 26 with impressed current $I_{OL}$ and the switch $S_3$ is bridged by a current source 27 with impressed current $I_{OH}$. The currents $I_{OH}$ and $I_{OL}$ are very small and may uniformly be of the order of magnitude of, for example, 1–20 µA. Without restricting the generality, the current sources can also be replaced by high-value resistors between, for example, 50–250 kΩ, as illustrated in FIG. 3b.

The termination resistors 16 and 17 are identical and are determined as a function of the number of bus subscribers, which is known beforehand. Normally, they may have, for example, 560 Ω±5% in the case of a relatively large bus network and at most 15 kΩ±5% in the case of a small bus network. The low resistance in relatively large bus networks is a consequence, on the one hand, of the higher capacitive burden on relatively large networks and, on the other hand, of the requirement of sufficient suppression of undesirable interference of static and electromagnetic nature in a spatially highly ramified bus network. In a bus network which is designed for about 20 subscribers, the internal resistor 17' (which is preferably integrated in the semiconductor circuit 100) has a value on the order of magnitude of 12 kΩ, assuming that resistor 17 is on the order of magnitude of 600Ω for normal termination. For more details on dimensioning, see FIG. 6 and FIG. 7 and the associated description. In practice, an ON resistance of the switches $S_1$ to $S_3$ of up to 200 Ω may be tolerable.

In the operating mode NORMAL (transmission and reception), the switches $S_1$ and $S_2$ are closed, whereas $S_3$ is open; that is, CAN_L is connected to VCC via the resistor 17 and CAN_H is connected to ground GND via the resistor 16. As long as there is no bus error present, the influence of the currents $I_{OH}$ and $I_{OL}$ is negligible.

To this extent, FIG. 4 illustrates only the essential parts of a network circuit diagram of a CAN (with, by way of example, three bus-networked units A, B and C); which is effective by virtue of the positioning of the switches $S_1$ to $S_3$, in the operating state NORMAL, as shown in Fig, 3a. All of the external termination resistors 16 and 17 of the bus subscribers A to C therefore respectively act on CAN_H and CAN_L in parallel.

Referring again to FIG. 3a, in the operating modes SLEEP and STANDBY, the switches $S_1$ and $S_3$ are closed, while $S_2$ is open. Thus, CAN_L is now connected to the higher potential VBATT via the higher internal resistor 17' and CAN_H is connected to ground GND via the resistor 16. As long as there is no bus fault present, the influence of the currents $I_{OH}$ and $I_{OL}$ is also negligible in this case.

Figure 5:
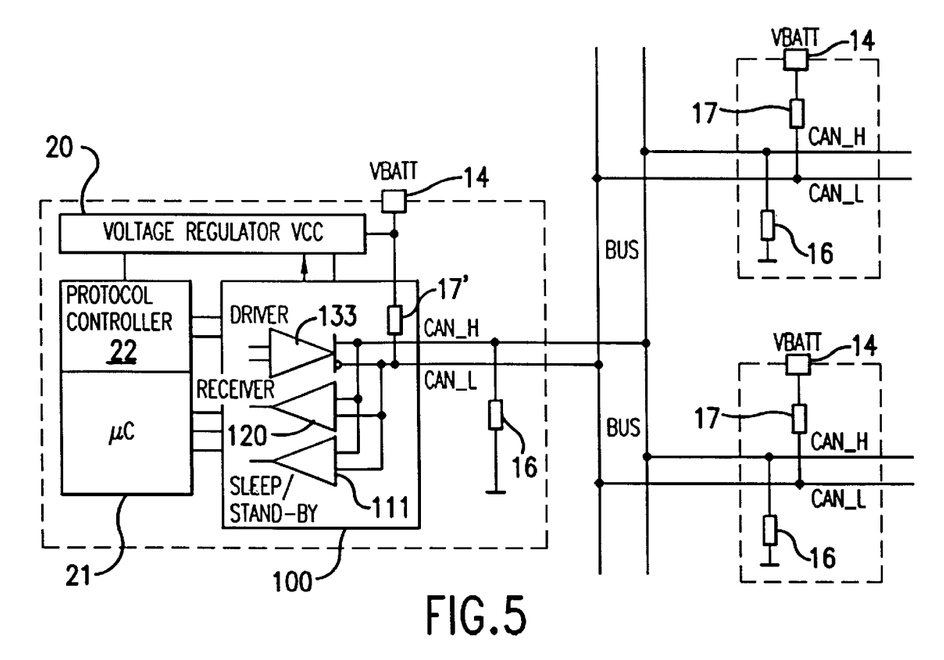
FIG. 5 is a schematic circuit diagram of the device according to the invention in a CAN network interconnection with other such devices, in the operating mode "SLEEP" or "STANDBY" without any bus errors.

In a corresponding manner, FIG. 5 illustrates only the essential parts of the network circuit diagram of the same CAN in the operating state SLEEP or STANDBY, which is effective in this case by virtue of the positioning of the switches $S_1$ to $S_3$ as indicated above. The external termination resistors 16 and the internal termination resistors 17' of the bus subscribers A to C therefore respectively act on CAN_H and CAN_L in parallel.

In the operating modes SLEEP and STANDBY, therefore, the bus termination is asymmetric in all of the units connected to the network. That is, on the one hand, the values of the resistors 16 and 17' differ (depending on the number of bus subscribers) approximately by a factor which corresponds to this number; and on the other hand, the resistors 17', unlike the resistors 17, are connected not to VCC as reference potential, but rather to the higher supply voltage VBATT. By virtue of this measure, the wake-up capability of the CAN via CAN_L is still ensured even when there is an interruption of CAN_H, as explained below with reference to FIG. 6 to FIG. 8.

Figure 6:
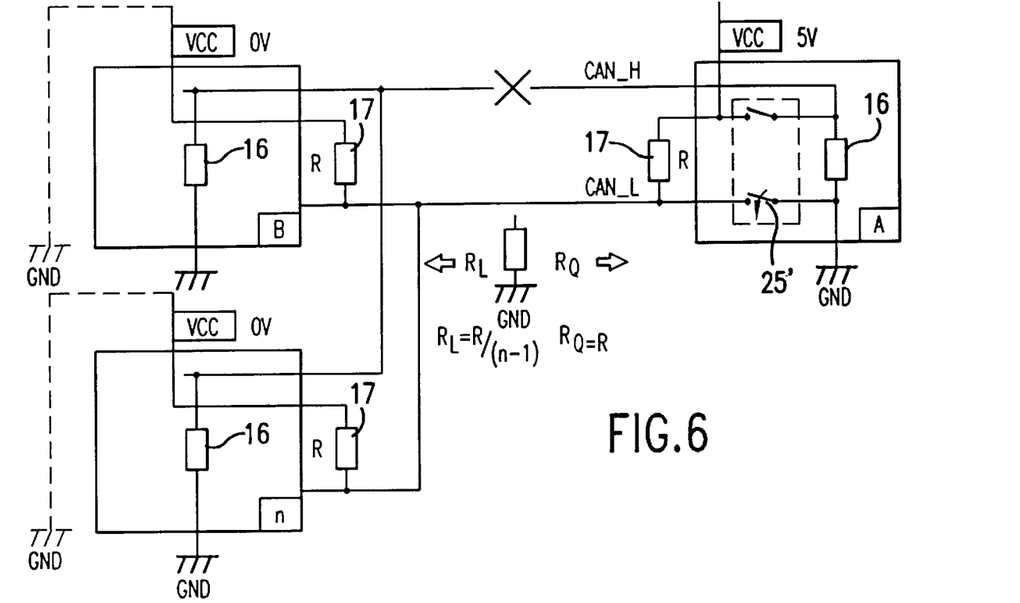
FIG. 6 is a schematic circuit diagram for explaining the wake-up inability from the SLEEP mode of a symmetrically terminated CAN via CAN_L in the event of an interruption of CAN_H.
Figure 7:
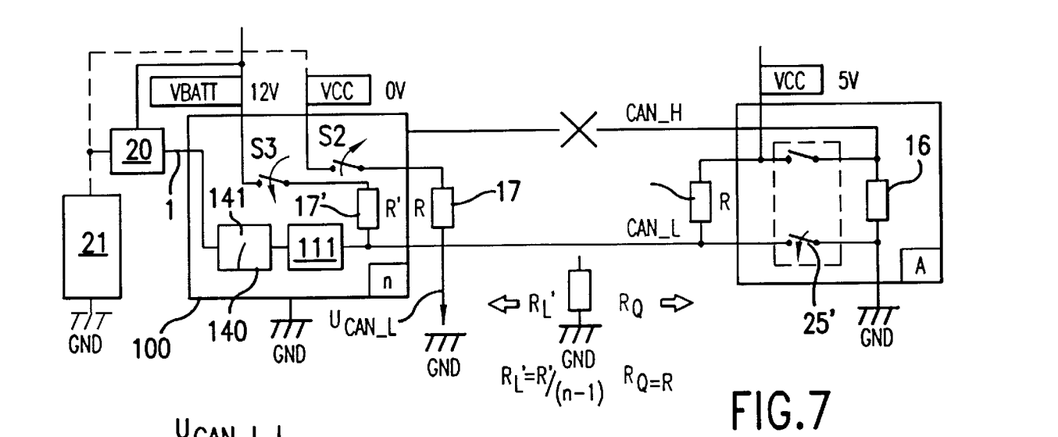
FIG. 7 is a schematic circuit diagram for explaining the wake-up ability from the SLEEP mode of an asymmetrically terminated CAN via CAN_L in the event of an interruption of CAN_H.

In FIGS. 6 and 7, the switch 25', shown in the unit A, represents the electronic switch which, in the event of activation, switches the core CAN_L from its high recessive level to the active level of the CAN_L, the said active level being only slightly above ground GND. The switch 25' thus not only functions similarly to the already mentioned switch 25 to ground GND at the local wake-up input 7 of the semiconductor circuit 100 (FIG. 1), but also becomes effective within the semiconductor circuit due to activation of an external local wake-up switch 25.

In FIG. 6, in the operating mode SLEEP, the voltage regulators 20 in the bus subscribers A to n (not shown) are switched off. As a result, VCC fails as termination potential, because in the absence of VCC all of the VCC busbars are connected virtually to ground GND internally in the units. If CAN_L were in this case terminated by resistors 17' having a value corresponding to that of the resistors 17 and 16 which are connected to VCC (that is, connected virtually to ground GND in the SLEEP state), a wake-up via the bus core CAN_L would not be possible, for example if there were an interruption in bus core CAN_H.

A resistor 17 having the value R—as wake-up source resistance $R_Q$—could, from the potential VCC in the waking-up bus subscriber A, raise the bus core CAN_L against the total load resistance to ground of $R_L=R/(n-1)$ (assuming, for example, 1/20 R based on 20 resistors 17 of the same value R acting in parallel in a bus network having 21 subscribers), only by a small fraction of VCC, to a potential in the range from 100–200 mV. Such a potential would not be sufficient to read such a wake-up message with immunity from interference. This problem grows with the number of network subscribers and parasitic ground offsets (due to current loops), e.g., along extended installations or vehicles.

A remedy is provided by the measures shown in FIG. 7, in which the resistor 17' has a considerably larger value, corresponding to a multiple of approximately the expected number n of units on the bus. (For example, approximately 12 kohms if the resistor 17 corresponds to approximately 600 Ω in a bus network having about 20 subscribers.) The waking-up unit A consequently "sees" the overall larger load resistance $R_L'=R'/(n-1)$.

In addition, the resistor 17' is not connected to the potential VCC (normally approximately 5 volts), which disappears in the operating state SLEEP. Rather, it is connectable by means of switch $S_3$ to the substantially higher supply potential VBATT (for example approximately 12 volts), which is available even in the operating mode SLEEP. As a result, the source function of the unit A waking-up in FIG. 6 changes over to a source function of all the units B to n to be awakened on the bus, while a sink function remains for the waking-up unit A in this respect.

Figure 8:
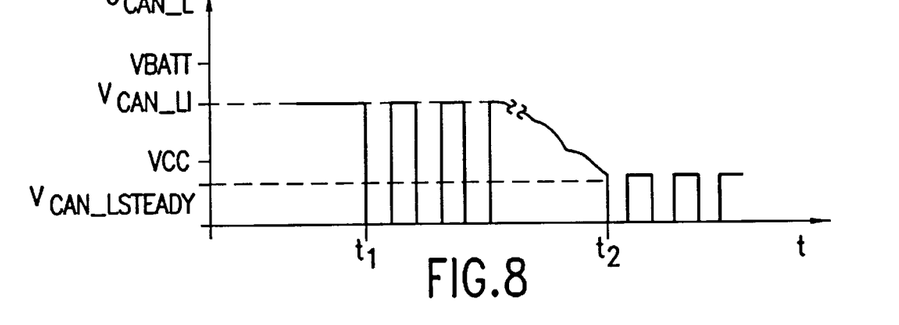
FIG. 8 is a diagram of the voltage profile on the asymmetrically terminated bus core CAN_L in the case of wake-up operation in accordance with FIG. 7.

FIG. 8 illustrates the voltage profile on the core CAN_L of a CAN which is asymmetrically terminated in this way in the SLEEP state, beginning at time $t_1$ of a wake-up operation via this core. The voltage oscillation on CAN_L initially has a value $V_{CAN\_Li}$ of between VCC and VBATT. Triggered by the wake-up message (which can be positively identified, given this large voltage swing) via CAN_L, the semiconductor circuit 100 generates the ENA/NINH signal in each of the subscriber units A to n connected to the bus. The ENA/NINH signal, on the one hand, switches on all the voltage regulators 20 in units A-n via the function blocks 111 and 140, together with switches or gates 141. Hence VCC becomes available in every unit.

On the other hand, given availability of VCC, the connection between CAN_L and the supply potential VBATT via the high-value termination resistor 17' is interrupted by means of the switch $S_3$, and instead CAN_L is connected by means of $S_2$ to the lower supply potential VCC via the normal termination resistor 17. It is therefore evident that the drop in the voltage swing on the bus via ground GND to a steady-state value $V_{CAN\_Lsteady}$ is concluded at $t_2$, the time interval $(t_2-t_1)$ essentially being the overall response time of the semiconductor circuit 100 and of the regulator 20 to a wake-up signal.

It may be noted at this point that individual bus subscribers within a bus network may well remain in the operating mode STANDBY, and others may remain in the SLEEP state. Other bus subscribers could in this case also be awakened by a unit in the operating mode STANDBY if it is possible to activate the low-side switch of the output stage 133 for this purpose in the sense of the symbolic switch 25'.

The operating mode STANDBY may be useful, for example, for the (waiting) material web draw-in of a printing machine, or the infrared receiving section of a locking system of a vehicle, which must wait continuously for the arrival of the material feed, or of the coded unlocking signal. In this state, the regulator 20 in such a unit is switched on, and VCC is consequently present, so that the time $(t_2-t_1)$ until there is a response via the bus is for the most part eliminated.

Without restricting the generality, the function block 131 may also have a circuit diagram in accordance with FIG. 3b, in which the resistors 17 and 17' each act in series. In this respect, the resistor 17' would be effective at the terminal 9 of the semiconductor circuit 100. However, this does not fundamentally change anything regarding the network consideration in accordance with FIGS. 4 to 11.

Furthermore, FIG. 3b illustrates that the resistor 26' (which corresponds to the current source 26 in FIG. 3a) can also be interruptibly connected to ground GND via a special switch SOL. This arrangement, for example, enables a test function in connection with automatic adaptation of the level comparison of the receiving means 120 and/or of the transmitting output stage 133 in the event of a bus error or in the case of external diagnostic measurements on the bus. This effect could also be realized in the case of FIG. 3a, by means of pinch-off control of the current source 26.

Figure 9:
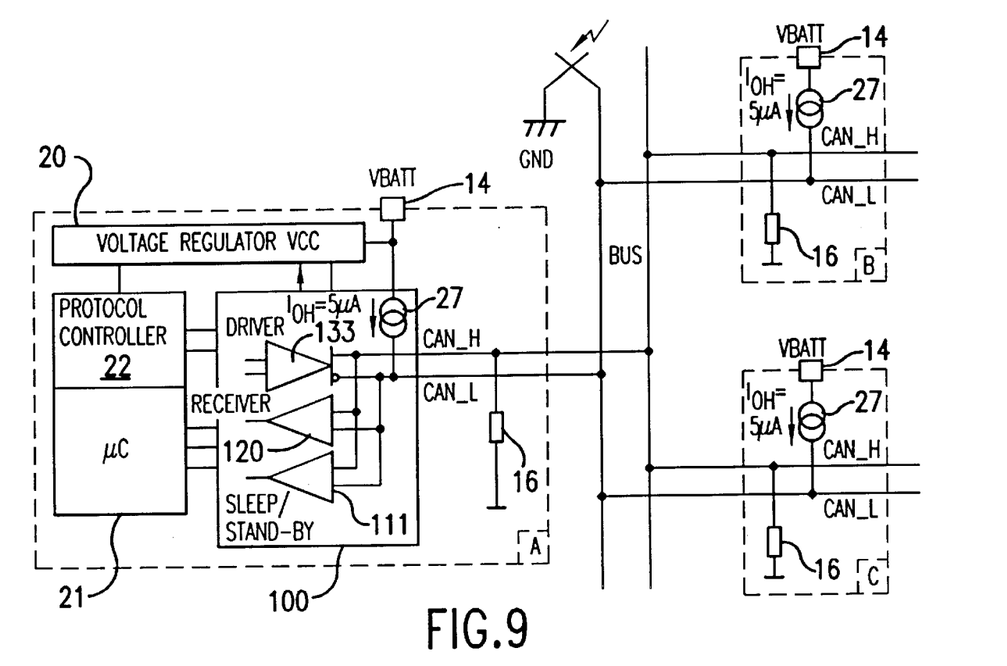
FIG. 9 is a schematic circuit diagram of the device according to the invention in a CAN network interconnection with other such devices, in the operating mode "SLEEP" or "STANDBY" with a ground fault on CAN_L.

Based on the circuit diagram in accordance with FIG. 3a, FIG. 9 illustrates the conditions in the wide network interconnection in the event of a short circuit of the bus core CAN_L to ground GND in the operating mode "SLEEP" or "STANDBY". Assuming a resistance value of, for example, 12 kΩ for resistor 17', there would occur in this case (in a network of 20 subscribers, for example) a resultant leakage resistance of 600 Ω throughout the bus between the internal unit supply potential VBATT of, for example 12 volts, and ground GND. That is, a leakage current throughout the bus of 20 mA could lead to rapid discharge of a battery as supply source.

Such a short circuit is therefore identified by the abovementioned function block 132 of the semiconductor circuit 100 (error identification module) in each individual bus subscriber, causing in each case the switch $S_2$ to open and the switch $S_3$ to close in the function block 131. As a result, the current sources 27 become active. Their comparatively small current of, for example, just 5 μA produces throughout the bus, for 20 units, a leakage current of just 0.1 mA. This current is negligible compared to the natural self-discharge rate of an emergency or starter battery, for example.

Figure 10:
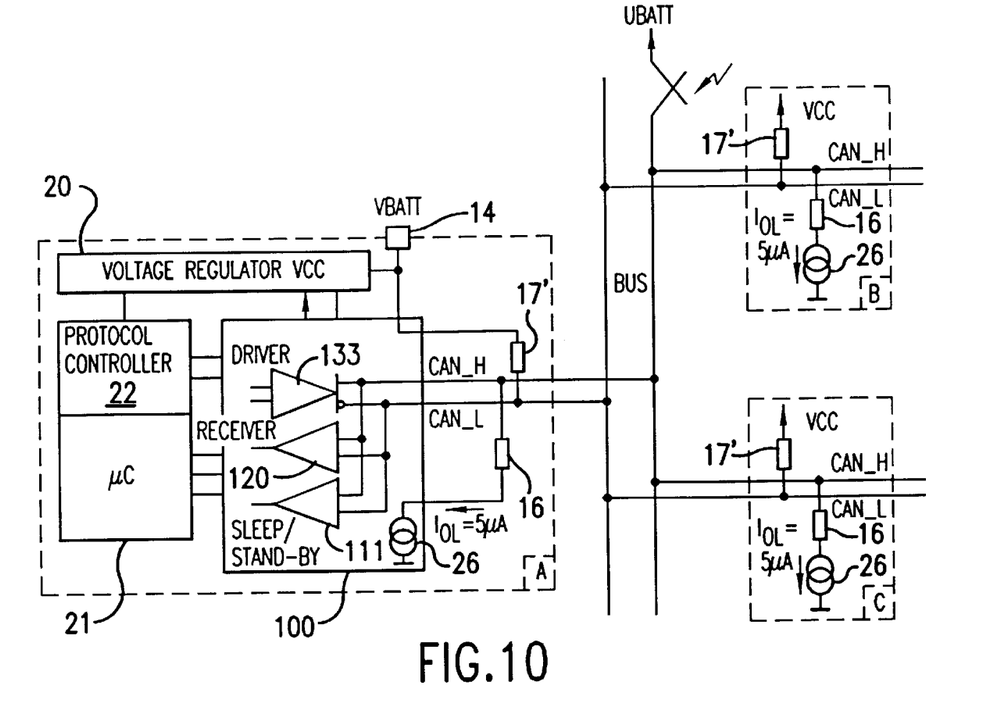
FIG. 10 is a schematic circuit diagram of the device according to the invention in a CAN network interconnection with other such devices, in the operating mode "SLEEP" or "STANDBY" with a supply fault on CAN_H.

FIG. 10 illustrates the corresponding conditions in the network interconnection in the event of a short circuit of the bus core CAN_H with an on-board electrical system bus bar to UBATT in the operating mode "SLEEP" or "STANDBY" (supply system fault).

Assuming a resistance value of, for example, 600 Ω for resistor 16, there would occur in this case (in a network comprising 20 subscribers, for example) a resultant leakage resistance of 30 Ω throughout the bus between, for example, the on-board electrical system terminal 30 at approximately 13 volts and ground GND. Such a short would therefore result in a total leakage current throughout the bus of 430 mA, which would lead to an even more rapid reduction in the battery charge available, for example, for starting the internal combustion engine.

If such a short circuit occurs, it is identified by the abovementioned error identification module 132 of the semiconductor circuit 100 in each individual bus subscriber, causing in each case the switch $S_1$ to open in the function block 131. As a result, the current sources 26 become active, Their comparatively small current (for example, just 5 μA) producing throughout the bus (for 20 units) a negligible leakage current of just 0.1 mA.

In the event of a short circuit of CAN_H or CAN_L to ground GND or to UBATT, as regards the changeover of the bus termination via switches $S_1$ to $S_3$, it makes no fundamental difference whether the relevant short circuit is already present when the microcontroller 21 transmits the SLEEP or STANDBY instruction to the semiconductor circuit 100, or rather the short circuit occurs only after the SLEEP or STANDBY operating state has been properly reached beforehand.

The hard-wired logic of the semiconductor circuit 100 has the effect that the level discriminator or comparator, which monitors the short-circuited bus core, within the function block 132 is latched and, as a result of the switching operation, the (local) termination on this particular bus core is changed over to "short circuit identified". That is, the current source 26 or 27 (or the resistor 26' or 27') is activated.

As soon as the short circuit disappears, the corresponding, very small input current (in FIG. 3a, for example, at 8 (RTH) or 12 (CAN_L)) in the SLEEP or STANDBY operating state pulls the relevant bus core to a potential close to the normal potential in these operating modes. As a consequence, the bus termination is changed over to the normal one in the SLEEP and STANDBY operating state (16 and 17' active)

Figure 11:
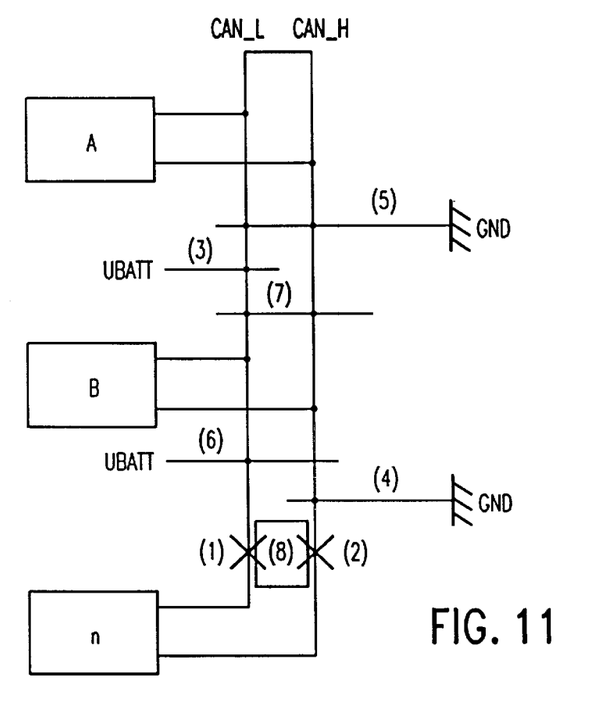
FIG. 11 is a schematic illustration of certain bus errors which can be directly identified and treated by the device.

For an overview, all of the error states in the bus network which can be identified overall by the semiconductor circuit 100 are put together in FIG. 11, the numerals in brackets representing the individual bus errors in accordance with the following list:

| | |
|---|---|
| (1) | Interruption of CAN_L |
| (2) | Interruption of CAN_H |
| (3) | Supply fault on CAN_L |
| (4) | Ground fault of CAN_H |
| (5) | Ground fault of CAN_L |
| (6) | Supply fault on CAN_H |
| (7) | Short circuit between CAN_H and CAN_L |
| (8) | Paired interruption of CAN_H and CAN_L |

The bus error (8) is strictly a double error, which can therefore be identified directly in an unambiguous manner only by the semiconductor circuit 100 in the unit n (for example for the purpose of fail-safe triggering of the function which is normally to be controlled by this unit).

It is essential that the bus error response logic, hard-wired in the semiconductor circuit in each individual bus subscriber (so that throughout the bus, distributed error handling intelligence is provided in the network) permits the realization of error response times of the order of magnitude of one (bus) bit interval or less. In this way, message losses in the course of bus-error-dictated reconfiguration of the transmitting and receiving components of the semiconductor circuit 100 can be largely or completely avoided. This is a major advantage over all the bus master solutions which are oriented centrally on the software basis.

Furthermore, the above-mentioned supply monitoring is implemented in the semiconductor circuit 100. Its purpose and function are explained as follows.

The fact that the voltage regulator 20 can be switched off in the SLEEP state means that the microcontroller 21 is regularly de-energized. For this reason, it is necessary to provide initialization of the microcomputer from the zero-current state as soon as the voltage regulator 20 has reset the microcontroller 21 via its PWROR output 20.4.

In the example of a motor vehicle, during every new start-up, the microcontroller must have access back to the incremental data which were valid at least during the immediately preceding operation of the motor vehicle, and correspond to setting states as found by the user prior to the renewed start-up. These include, for example, data relating to the setting of adjustable seats, rear mirrors, etc. This is typically achieved by storing the data in an EEPROM of the microcontroller 21 and loading them into the RAM of the latter at the beginning of every start-up. In this way, stop runs for establishing the current set position relative to the end stops of adjustable elements, and the time inevitably taken up by this, which is annoying, become superfluous.

If the unit containing the micro-controller 21 is removed from a bus system, for example, in order to replace it or to insert it into a different bus network, the problem arises that the microcontroller on its own cannot register such handling of the unit containing it as the factual) cause of de-energization that has previously occurred. Thus, after the relevant unit has been installed in a new bus network, the microcontroller would continue to regard the previously learned data preserved in its EEPROM as valid, and would use it, in the new bus network as well. This would lead to incorrect control of the elements to be controlled by the unit under consideration in the event of start-up in the new bus network.

The remedy for this problem is provided by virtue of the supply monitoring which is integrated into the semiconductor circuit 100, and in particular by the POWER FAIL criterion which is derived from the discrimination of the voltage levels VBATT and VCC in the function block 110 and passes via the path 152 into the control block 140. This function utilizes the fact that the semiconductor circuit 110 draws its electrical supply from the higher potential VBATT which is stored upstream of the regulator 20. When the supply from the superordinate potential UBATT is interrupted (due to an interruption of the current supply of terminal 30 in the case of a vehicle, for example) VBATT collapses more rapidly than the potential VCC, which is maintained for certain minimum time intervals by means of filter and back-up capacitors 161, as is evident from FIG. 13.

For this purpose, voltage level monitoring operations are carried out and evaluated in the function block 110 in accordance with the following scheme, by way of example. In this instance, the situation in a motor vehicle and voltages occurring therein are again used as a basis, without limiting the generality of the invention:

If, for example, VBATT>6 V and VCC=5 V, neither the microcontroller 21 nor the semiconductor circuit 100 are able to identify a power fail state.

The function block 110 monitors and compares VBATT, which is normally at 12 volts, with a limit value VL1 of, god for example, 3.5 volts. Also, if the microcontroller 21 or its watchdog does not have dedicated power fail identification, this function block furthermore monitors and compares VCC, normally 5 V, with a second limit value VL2 of, for example, 1 V (the minimum voltage necessary for dynamic data retention in the RAM of the microcontroller 21).

Within the framework of the invention, it will be irrelevant whether the microcontroller has dedicated power fail identification for VCC. Also, to the extent that the components of the device are not used or are used differently, a separate watchdog function (not described in greater detail here) for the microcontroller can be used to achieve corresponding VCC discrimination and evaluation.

Within the framework of the invention, it is possible, irrespective of whether the microcontroller 21 is also supported by dedicated auxiliary circuits (such as, for example, a watchdog-armed supply voltage monitoring arrangement) to output at terminal 4 a POWER FAIL INTERRUPT signal, which goes back either to a discrimination of VBATT only or to a combined discrimination of VBATT and VCC. When, therefore, a power fail flag of the semiconductor circuit 100 is subsequently mentioned, this does not mean that the microcontroller 21 does not have dedicated VCC monitoring, or is not provided with auxiliary means which achieve such monitoring.

For example, in an engine start, if VBATT>VL1 and VCC>VL2, power fail is not identified either for VBATT or for VCC, so that a corresponding signal is not output at terminal 4 either. From the fact that the power fail flag in the function block 145 or 143 is absent (is not set) with regard to VCC and/or VBATT, the microcontroller 21 consequently recognizes, during its restart after reset, that neither relearning nor an update of incremental data from the dedicated EEPROM is necessary. It therefore continues to operate with those data currently residing in its RAM. In this case, the power fail flag is read (as shown for example in FIG. 12a) in the time period between $t_8$ and $t_9$, and when it is set before the transition of the signal EN (output by the microcontroller 21) from "L" to "H", it is translated into an INTERRUPT signal at terminal 4. The latter is identified by the microcontroller 21 as genuine, and is interpreted as POWER FAIL INTERRUPT.

In the case of a more difficult engine start, such as in winter, the on-board electrical system voltage UBATT may, however, briefly drop substantially below the initial rated voltage VL1. As a result, VBATT also drops by a corresponding amount, whereas VCC is still held above VL2 after initial energization of the regulator 20, by a back-up capacitor 161 arranged downstream of the latter. In the block 110, therefore, although the supply state VBATT<VL1 is identified, at the same time the supply state VCC>VL2, which prevents (inhibits) the setting of the power fail flag in the function block 145 or 143.

Because the power fail flag is not set, no INTERRUPT signal is output at terminal 4 (from power fail for VBATT). From the absence of this interrupt, the microcontroller 21 recognizes that neither relearning nor an update of incremental data from the dedicated EEPROM is necessary, and continues to operate with the data currently residing in its RAM.

On the other hand, when an engine start has proceeded normally, but the supply potential VCC has collapsed (for example momentarily), for whatever reason, the situation VBATT>VL1, VCC<VL2 may arise, which can be evaluated as follows. In this case, logic means in the function block 145 or 143 prevent the power fail flag from being set in 143 and, as a result, no INTERRUPT is output at terminal 4.

If the microcontroller 21 is provided with dedicated VCC monitoring, or with an auxiliary unit which provides such monitoring for it (that is, the microcontroller is provided with a dedicated power fail flag) it can recognize, from the absence of the external POWER FAIL INTERRUPT at terminal 4 of semiconductor circuit 100 and from the fact that its dedicated VCC power fail flag is set, that relearning of incremental data is not necessary, but that the data which are currently to apply must first be loaded into its RAM from its EEPROM.

The last situation, in which the on-board electrical system completely collapses (for example after lengthy attempts at starting so that VCC also collapses) is treated in the same way as the removal of the battery or an interruption of the power supply from terminal 30 to the bus subscriber under consideration. That is, it is treated in the same way as the removal of a corresponding unit from its bus network.

In this case: VBATT<VL1 (=3.5 volts) and VCC<VL2 (=1 volt). These two conditions result in setting of the power fail flag in the function block 145 or 143 and, consequently, the output of a POWER FAIL INTERRUPT signal at terminal 4 of semiconductor circuit 100. In addition, the microcontroller's power fail flag with regard to the VCC is also set in the microcontroller. This state and the POWER FAIL INTERRUPT signal at terminal 4 are evaluated by the microcontroller 21 as evidence that the continuous-current-supplied terminal 30 has been disconnected and reconnected. This causes the microcontroller, during its restart, to learn end stops and relative position(s) of the element controlled by it and to store them in its EEPROM.

Since, specifically in the SLEEP state VCC=0 volts, a power fail with regard to VCC can always be identified by the microcontroller into or out of this state. Thus, the evaluation of whether the electronic unit containing the microcontroller 21 (and the device according to the invention) has been isolated from its power supply in the SLEEP state depends essentially on the power fail identification with regard to VBATT in the function block 145 or 143, which is achieved by the device in the manner described.

By suitable dimensioning of back-up capacitors for VCC, or supply potentials (derived therefrom) of digital circuit functions in conjunction with the microcontroller 21, it is possible, for example, to satisfy the requirement that the system be capable of enduring an interruption in the supply potential UBATT lasting 1.5 seconds, for example, without any data loss and power fail identification with regard to VCC. On the other hand, after an interruption of, for example, at least 30 seconds, a relearning cycle with regard to the data to be stored incrementally on end stops must be initiated during the restart of the-microcontroller.

With regard to the possible functions of the blocks 110 and 143, the scope of the invention is not restricted to the exemplary supply monitoring arrangements mentioned above. Other arrangements, depending on the application, may also be expedient in this respect. In particular, the semiconductor circuit may have a larger number of terminals (thus, for example, also in the case of integration as a standard cell), and it may also have additional inputs for the selection of different fixed-programmed supply monitoring modes, which can be selected in accordance with selection circuitry or addressing.

In connection with such supply monitoring, the above mentioned mandatory disconnection of the transmitting output stage 133 may optionally be provided, so that the output stage 133 is disconnected from CAN_H/CAN_L when the potential VBATT and/or VCC drops below a predetermined threshold value, thereby avoiding a burden which adversely affects the functioning of the bus. This aspect is represented by the connection 157 in FIG. 2.

Figure 12B:
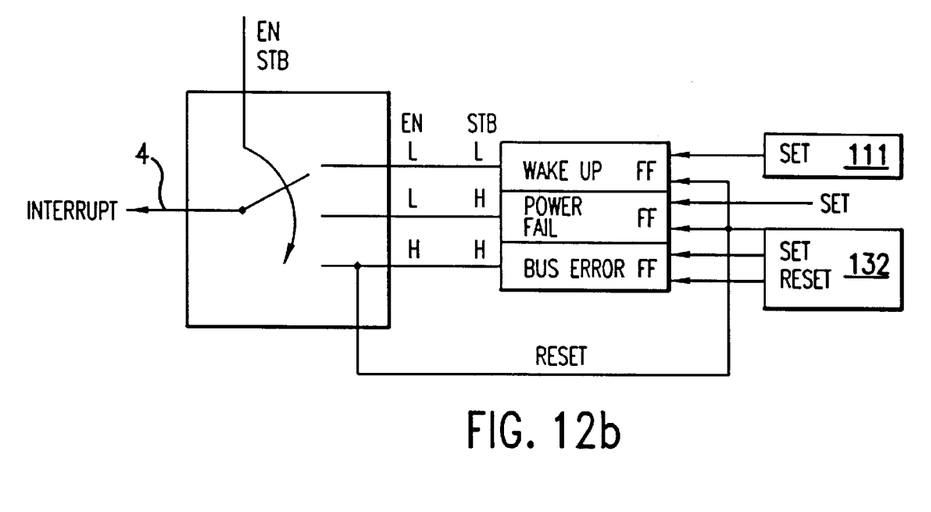
FIG. 12b is a block diagram which shows the evaluation of an error or interrupt signal of the device, the evaluation differing depending on the operating state.

FIG. 12a is a timing diagram which shows the operation of the device with regard to the essential voltage and signal levels following application of the supply potential UBATT and the supply potential VBATT. It also shows how microcontroller responds to the ERR/INT signal, which is to be interpreted here. FIG. 12b is a function diagram which illustrates the operation described in connection with FIG. 12a.

At the time $t_3$1 the device is connected to UBATT and VBATT. After a short delay, at the instant $t_4$, the semiconductor circuit 100 emits the signal ENA/NINH at the control output 1 to the control input 20.3 of the regulator 20, whereupon the supply voltage VCC of the microcontroller 21 builds up until the instant $t_5$. Thereafter, at time $t_6$ the regulator 20 emits the PWROR signal for the purpose of resetting the microcontroller 21 for initialization.

In order to ensure this reaction, the semiconductor circuit 100 (in particular the function block 110 thereof) may cause the ENA/NINH signal to be initially generated first of all independently of the logic status of the EN and STB inputs in the event of start-up application of VBATT to the input 14 (connection of a control unit with the device to UBATT). In this manner, it is possible to energize the microcontroller 21 for the purpose of reading in its EN and STB signals, which subsequently control the operating state of the semiconductor circuit 100.

An ERR/INT signal output at terminal 4 is subsequently interpreted by the microcontroller 21 depending on the logic level of the STB and EN signals output by the microcontroller. Since the latter signals specify the operating mode of the semiconductor circuit, the ERR/INT signal is thus interpreted as a function of the operating modes SLEEP, STANDBY/RECEIVE ONLY and NORMAL of the said semiconductor circuit, as follows.

By the time $t_7$, the microcontroller 21 has reliably concluded its initialization together with port check. During a succeeding time interval, the so-called POWER-ON PHASE between $t_7$ and $t_8$, both signals STB and EN on the part of the microcontroller still have the logic level "L", corresponding to a setting of the semiconductor circuit 100 to the SLEEP state. If a wake-up signal, for example from the switch 25, is identified at 7-in this logic state, the wake-up flag is set in the function block 145 or 143. This leads, in the state before the transition of the STB signal from "L" to "H", to the triggering of an INTERRUPT signal at terminal 4 (that is, in the first signal window for ERR/INT). The latter signal in this time interval is interpreted by the microcontroller 21 as WAKE-UP INTERRUPT. The top switch position in FIG. 12b, for the interrogation of the wake-up flip-flop in the block 145 or 143, corresponds to this case.

The bus error identification arrangement 132 may preferably still be inactive in at least part of the POWER-ON phase by virtue of means which are effective, for example, as a result of the rising edge VCC at the terminal 10 of the semiconductor circuit 100.

During the succeeding time interval between $t_8$ and $t_9$, the so-called RECEIVE ONLY PHASE, the microcontroller outputs STB="HI", EN="L". If the power fail flag has previously been set or is set in 145 or 143, in this logic state an INTERRUPT signal is triggered at terminal 4, (that is, in the second signal window for ERR/INT), before the transition of the EN signal from "L" to "H". An INTERRUPT at terminal 4 in this time interval is interpreted by the microcontroller 21 as a POWER FAIL INTERRUPT. The middle switch position in FIG. 12b, for the interrogation of the power fail flip-flop in the block 145 or 143, corresponds to this case.

At time $t_9$, full communications capability is established, and the microcontroller outputs EN="H", STB ="H". If the bus fault flag has previously been set or is set in the bus fault evaluation block 144 or in 143, this leads in this logic state to the triggering of an INTERRUPT signal at terminal 4, that is, in the third signal window for ERR/INT. An INTERRUPT at terminal 4 from the instant $t_9$ is interpreted by the microcontroller 21 as BUS ERROR INTERRUPT. The bottom switch position in FIG. 12b, for the interrogation of the bus fault flip-flop in the block 144 or 143, corresponds to this case.

FIG. 12b also illustrates the resetting of the wakeup flag and of the power fail flag, which is done as a function of the signals EN and STB when both EN="H" and STB="H". This ensures that after a following transition to the operating mode SLEEP (EN="L", STB="L"), in the event of renewed wake-up, the flag register is clear again and can thus be set.

Figure 13:
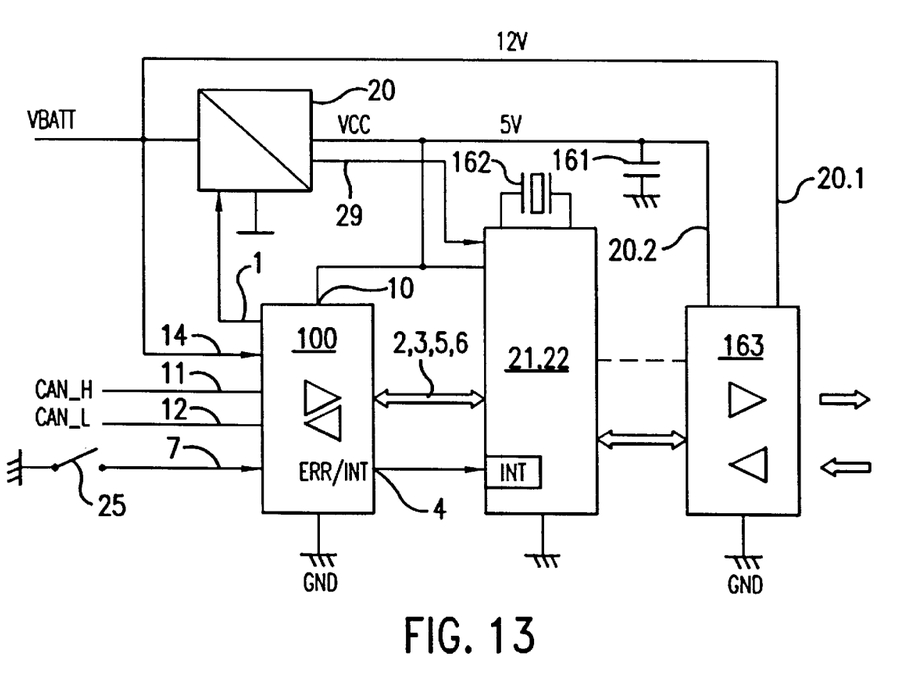
FIG. 13 is an overall block diagram for roughly illustrating the simple structure of a unit which is equipped with the device and can be operated in a bus-networked manner.

To this extent, an electronic unit which comprises the device according to the invention may roughly have an overall block diagram in accordance with FIG. 13. In addition to parts already mentioned, there are also provided a central back-up capacitor 161 for the potential VCC at the regulator output 20.2, a component 162 which determines the clock frequency of the microcontroller 21, and, as interface between sensors and actuators and the microcontroller 21 with the bus protocol module 22, an input/output interface 163, which is supplied with power both from VCC and from VBATT. This illustration makes it clear that the semiconductor circuit 100 can to an extent be considered as an interface between CAN_H/CAN_L and the microcontroller 21 and the bus protocol module, both in terms of its above-described functions and of its arrangement in the communications path.

It also important to note that the semiconductor circuit 100, and in particular its transmitting output stage 133, are inherently protected against all possible bus faults. Moreover, within the scope of the function block 130, by virtue of the function blocks 131 and 132, bus handling in the event of a fault for the purpose of maintaining communications functionality is effected purely by means of hardware, other than the microcontroller. As a result, the microcontroller and the bus protocol function assigned thereto can be completely switched off.

This feature is further supported by an optional design of the transmitting unit 130 (or at least of the output stage 133 which the latter comprise) to be automatically disconnected from the bus when a defect is present in the semiconductor circuit 100. As a result, the bus network cannot be blocked by a unit which is disturbed to this extent.

For completeness, it should be mentioned that the unit of the semiconductor circuit 100 which identifies the best available alternative for emergency communication via the bus, and which sets, reconfigures and/or adapts the transmitting and receiving means thereto in the event of an error, can act on the basis of analog comparisons of the bus core potentials, with fixed tolerance windows for these potentials.

Without restricting the generality, the semiconductor circuit 100 may also comprise in this connection filter elements (not shown), in particular having a low-pass filter characteristic. For example, such filter elements can be provided between the terminal 7 and the wake-up identification logic arrangement 111, and between the terminals 11 and 12 for CAN_H and CAN_L and the respective inputs of the (autonomous) receiving block 120 and the error identification module 132 and/or the bus input of the wake-up identification logic arrangement 111.

Such filters increase the signal-to-noise ratio and reduce the response sensitivity of the circuit 100 to radio-frequency interference (EMC), including that which is added to the useful signal in the event of bus-error-dictated single-wire operation via ground GND in the ground return path. In the simplest case, they may be analog RC low-pass filters whose elements may be distributed in the semiconductor circuit 100 in a circuit-topological manner.

Equally, they may be quasi-digital filters, for example having a predetermined response time of the order of magnitude of several bus bit lengths.

Without restricting the generality, the semiconductor circuit 100 may be a library cell (standard cell) which can be transferred either in original fashion or in compilable fashion onto semiconductor chips in order to produce its physical manifestation there by means of different technologies. In this sense, the invention also includes the realization of the semiconductor circuit 100, the microcontroller 21 and/or the bus protocol module 22 on a single semiconductor chip. To this extent, these elements are of monolithic design, the monolithic circuit obtained in this way then having at least two zones which are supplied with power differently.

In this manner, it is possible not only to minimize the required number of soldered connections in a correspondingly equipped electronic unit, but also substantially to reduce the space requirement, so that the device is also suitable for use in applications such as vehicles, which must be kept very small. In such embodiments, the device may comprise special, co-integrated means, which render external protective means unnecessary, thus making the receiving and transmitting means connected to the bus outwardly tolerant of all possible error states, throughout the bus.

In the light of the above, use of the device is particularly suitable in vehicles, whose bus networks for the operation of control units are particularly adaptable to a limited energy reserve.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for the bus-networked operation of an electronic unit having a microcontroller for implementing communications with other units via a two-core bus, said device comprising:
  a bus protocol module in said microcontroller, for controlling communications with said other units, said bus protocol module having at least two operating modes as a function of status signals of the microcontroller, said operating modes comprising at least a transmission and reception mode NORMAL, and a sleep mode SLEEP;
  a semiconductor circuit arranged in a signal flow path between said bus protocol module and said two core bus, and supplied from a superordinate potential, said semiconductor circuit comprising
    a receiving circuit connected to cores of the two core bus and having an output coupled to communicate with a receiving input of the bus protocol module;
    a transmitting circuit connected to said cores of the two core bus and having a transmitting output stage, the input of which is coupled to communicate with a transmission output of the bus protocol module; and
    a wake-up identification circuit connected to said cores of said two core bus and having a wake-up input and switching means for providing, at a control output, a switch-on signal after identification of a wake-up signal received at said wake-up input or from the two core bus, and for emitting a switch-off signal in the operating mode "sleep"; and
    a voltage regulator coupled to be supplied from the superordinate potential, and providing a regulated output voltage to the microcontroller and to the bus protocol module, said voltage regulator having a control input which communicates with the control output of the semiconductor circuit, and being configured to switch on in the presence of the switch-on signal and to switch off in the presence of the switch-off signal.

2. Device according to claim 1 wherein the voltage regulator has a reset output and an autonomous circuit which generate a reset signal at said reset output after the voltage regulator has been switched on for the purpose of providing a secondary potential for the supply of the microcontroller, which reset signal is input to a reset input of the microcontroller.

3. Device according to claim 1 wherein the semiconductor circuit comprises means, operative upon occurrence of a bus error that impairs normal communication via the two bus cores, for reconfiguring said semiconductor circuit to utilize a best possibility which still exists for emergency communication via the bus, both with regard to its receiving circuit and with regard to its transmitting circuit, independently of the microcontroller.

4. Device according to claim 1 further comprising two termination elements connected to the semiconductor circuit, and having operating parameters which are defined as a function of the number of bus subscribers, wherein the semiconductor circuit further comprises:
  a bus fault identification circuit for identifying faults in said bus;
  a cooperative bus termination changeover circuit for influencing the bus termination; and
  a bus fault and wake-up evaluation circuit for conditioning and outputting at least one error or interrupt signal to the microcontroller.

5. Device according to claim 1 wherein the voltage regulator has means for generating a switch-on-responsive reset signal, and an output for emitting said reset signal, which output is connected to the microcontroller.

6. Device according to claim 1 wherein the receiving circuit is configured to be adapted, independently of the transmitting means, for the best possibility which still exists for emergency communication via the bus.

7. Device according to claim 4 wherein the bus error identification circuit, and bus termination changeover circuit are configured to switch-connect the termination elements to the two bus cores of the two core bus in the NORMAL operating mode and, to switch-connect a first back-up termination element integrated in the semiconductor circuit to the two bus cores, instead of at least one of the said termination elements in the SLEEP mode, and, depending on the nature of an identified bus fault, to switch-connect second and third back-up terminations integrated in the semiconductor circuit to the two bus cores, instead of at least one of the termination elements, to at least one of the two bus cores.

8. Device according to claim 1 wherein the receiving means and transmitting means are intrinsically realized, whereby they are tolerant of all possible errors in an application-specific manner throughout the bus.

9. Device according to claim 1 wherein at least the transmitting output stage is disconnectable from the bus in the event of an inherent fault of the device.

10. Device according to claim 1 wherein the transmitting circuit comprises means for switching off the power supply of the transmitting output stage upon the occurrence of an inherent fault of the device.

11. Device according to claim 1 wherein the semiconductor circuit is configured so that, in the SLEEP mode, termination of the two bus cores is asymmetric (in terms of impedance) with respect to a reference potential.

12. Device according to claim 7 wherein a first back-up termination is connected to the superordinate potential.

13. Device according to claim 7 wherein the first back-up termination is a resistor having a value which is approximately a multiple of the value of the normal termination resistor, said multiple corresponding to a number of bus subscribers.

14. Device according to claim 7 wherein the second and third back-up terminations are impressed current sources.

15. Device according to claim 7 wherein the second and third back-up terminations are high-value resistors.

16. Device according to claim 1 wherein the semiconductor circuit has the further operating modes RECEIVE ONLY and STANDBY, in which either the power supply of the transmitting output stage can be switched off or the transmitting output stage can be selectively disconnected from the bus.

17. Device according to claim 1 wherein the semiconductor circuit comprises a circuit for monitoring at least the superordinate potential UBATT/VBATT to detect drops below a first limit value, as well as a first evaluation circuit which evaluates an identified drop below the first limit value as a POWER FAIL error or interrupt signal for the microcontroller.

18. Device according to claim 1 wherein the semiconductor circuit comprises a circuit for monitoring the supply potential of the microcontroller to detect drops below a second limit value, as well as a second evaluation circuit which evaluates an identified drop below the second limit value as a POWER FAIL error or interrupt signal for the microcontroller.

19. Device according to claim 17 further comprising a bus error identification circuit, a bus termination changeover circuit, and a bus fault evaluation circuit for conditioning at least one error or interrupt signal for output to the microcontroller; wherein an output of said bus fault evaluation circuit is logically combined with an output of said first evaluation circuit.

20. Device according to claim 17 further comprising a logic element which causes the error or interrupt signal to be generated when both limit values have been exceeded in a downward direction.

21. Device according to claim 18 further comprising a logic element which causes the error or interrupt signal to be generated when both limit values have been exceeded in a downward direction.

22. Device according to claim 1 wherein the transmitting output stage is disconnected from the bus when the superordinate potential drops below a predetermined limit value.

23. Device according to claim 22 wherein disconnection is effected by blocking a control input for active connection of the transmitting circuit to the bus.

24. Device according to claim 3 wherein upon the occurrence of a fault, the identification of a best possibility which still exists for emergency communication via the bus and the setting, reconfiguration or adaptation of the semiconductor circuit are effected by analog comparison of bus core potentials with tolerance windows.

25. Device according to claim 23 wherein the setting, reconfiguration or adaptation are effected in a manner which avoids message losses.

26. Device according to claim 1 wherein the semiconductor circuit comprises filter elements arranged at least between each of the two bus cores and a corresponding input of the receiving circuit, and between the wake-up input and the wake-up identification circuit.

27. Device according to claim 1 wherein the semiconductor circuit is monolithically realized on a semiconductor chip.

28. Device according to claim 1 wherein the semiconductor circuit is monolithically integrated with the bus protocol module.

29. Device according to claim 1 wherein the semiconductor circuit is monolithically integrated with the microcontroller.

* * * * *